Oct. 11, 1960 W. FRED 2,955,391
WORK POSITIONING MECHANISM FOR MACHINE TOOLS
Filed Dec. 22, 1958
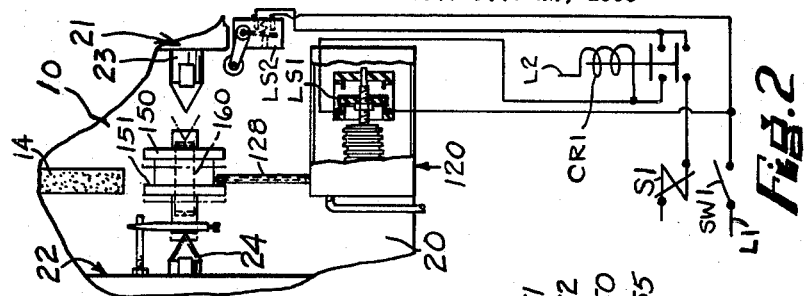
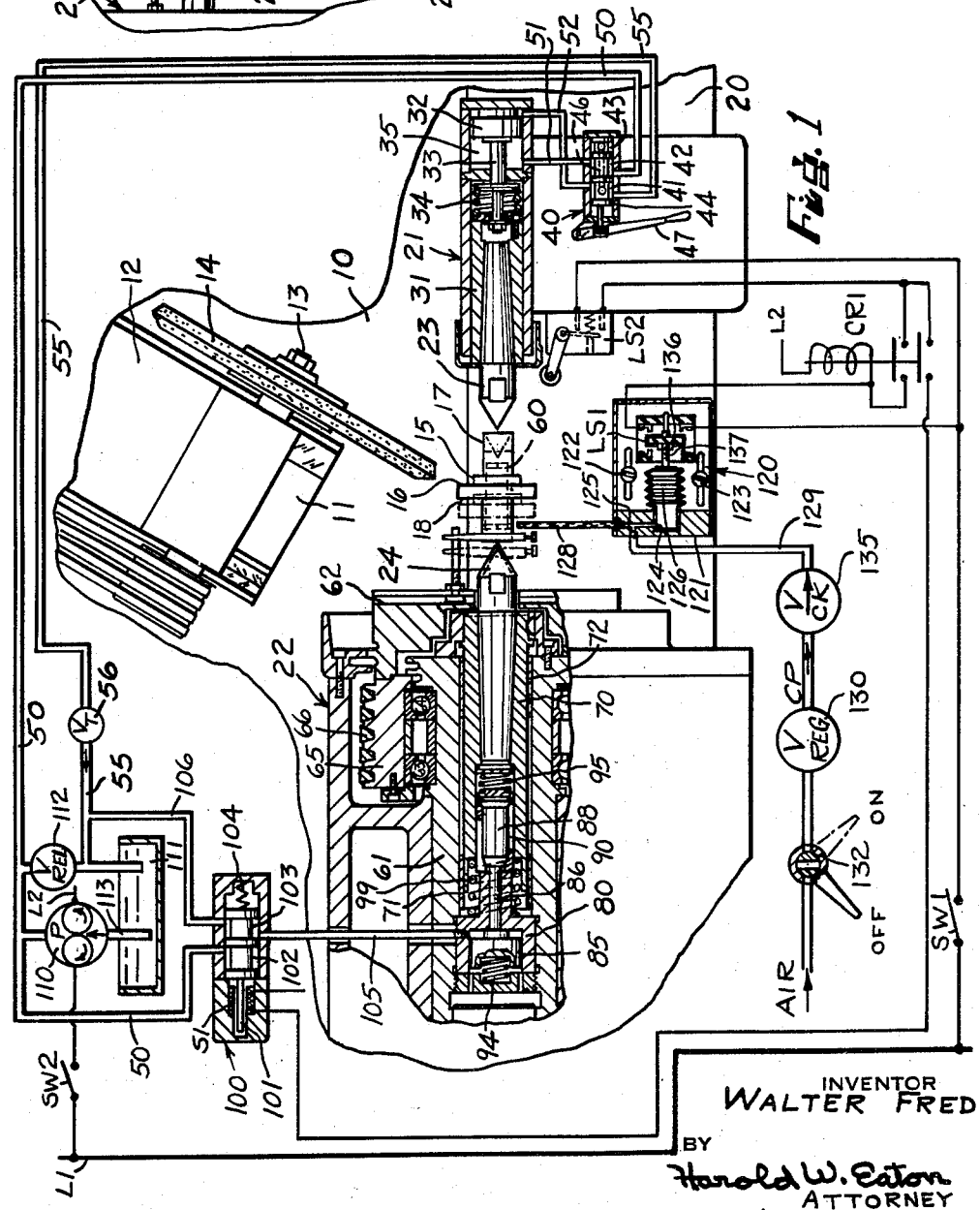
INVENTOR
WALTER FRED
BY
Harold W. Eaton
ATTORNEY

United States Patent Office 2,955,391
Patented Oct. 11, 1960

2,955,391

WORK POSITIONING MECHANISM FOR MACHINE TOOLS

Walter Fred, West Boylston, Mass., assignor to Norton Company, Worcester, Mass., a corporation of Massachusetts Filed Dec. 22, 1958, Ser. No. 782,034

5 Claims. (Cl. 51—165)

The invention relates to machine tools, and more particularly to an axial work positioning apparatus for a machine tool, such as a grinding machine.

One object of the invention is to provide a simple and thoroughly practical work positioning mechanism for precisely positioning a work piece in an axial direction and holding it in a predetermined position during a machining operation. Another object is to provide a work positioning apparatus in which the work positioning probe remains at all times out of engagement with the surface of the work piece. Another object is to provide a work positioning apparatus in which air under pressure is utilized to precisely position the work piece in an axial direction. Another object is to provide an axially movable work positioning mechanism and a clamping means for a headstock spindle to facilitate positioning and maintaining a work piece in a predetermined relationship with the cutting tool. Other objects will be in part obvious or in part pointed out hereinafter.

In the accompanying drawings in which is shown one of various possible embodiments of the mechanical features of this invention:

Figure 1 is a fragmentary combined plan view and sectional view combined with a hydraulic and electrical diagram; and Figure 2 is a fragmentary plan view, partly in section, of a modified form of the positioning apparatus.

A machine tool, such as a grinding machine, has been illustrated in the drawings having a base 10 which supports a wheel slide base 11. The wheel slide base 11 is provided with slide ways for supporting a transversely movable wheel slide 12. The wheel slide 12 supports a rotatable grinding wheel spindle 13 in suitable journal bearings (not shown). A grinding wheel 14 mounted on one end of the wheel spindle 13 is arranged simultaneously to grind a cylindrical portion 15 and an adjacent shoulder 16 on a work piece 17.

Base 10 also supports a table 20 which in turn supports a footstock 21 and a headstock 22 which are provided with work supporting centers 23 and 24, respectively. The footstock 21 is clamped in an adjusted position on the table 20. The footstock 21 supports a slidably mounted spindle 31 having the center 23 mounted in the left hand end thereof. The spindle 31 is connected by a piston rod 33 with a piston 32 which is slidably mounted within a cylinder 35. A spring 34 is provided between the piston rod 33 and the spindle 31 so as to form a yieldable connection in case the work piece 17 expands as the machining operation progresses.

A piston type valve 40 is provided to control the admission to and exhaust of fluid from the cylinder 35. The valve 40 is provided with a slidably mounted valve member 44 which is provided with a plurality of spaced valve chambers 41, 42 and 43. The slidably mounted valve member 44 is also provided with a central passage 46 which interconnects the valve chamber 41 with the valve chamber 43. A manually operable control lever 47 is pivotally supported on the valve 40 and is connected to the left-hand end of the valve member 44 to facilitate shifting the valve into the desired position.

In the position of valve 40 (Figure 1) fluid under pressure is passed from a pipe 50 through the valve chamber 42 and the pipe 51 into the left-hand end chamber of the cylinder 35 to move the piston 32 and the center 23 into a right-hand end position. Fluid exhausts from the right-hand end chamber of the cylinder 35 through the pipe 52, through the valve chamber 41 and exhausts through a pipe 55 and through a throttle valve 56. The throttle valve 56 serves to facilitate controlling the rate of movement of the piston 32 and the footstock center 23. When the lever 47 is moved toward the left, the slidably mounted valve member 44 is positioned so that fluid under pressure from the pipe 50 passes through the valve chamber 42, through the pipe 52 into the right-hand end chamber of the cylinder 35 to move the piston 32 and the center 23 toward the left so as to engage the work piece 17 which has been placed on a work loading rest 60.

The headstock 22 is provided with a longitudinally extending fixed sleeve 61 which supports a rotatable face plate 62 on a pair of spaced antifriction bearings 63 and 64 by means of a multiple V-groove pulley 65 driven by a plurality of spaced V-belts 66. The sleeve 61 contains a slidably mounted axially movable spindle 70 which slides within spaced bearings 71 and 72 which are fixedly mounted within the sleeve 61 and supports center 24 in fixed relation thereto. A cylinder 80 is fixedly mounted within the left-hand end portion of the sleeve 61. The cylinder 80 contains a slidably mounted piston 85 which is connected by a piston rod 86 with a collet chuck 90. The chuck 90 comprises an enlarged portion 88 which may be formed integrally with the piston rod 86. The portion 88 is provided with the frusto-conical shaped surfaces which meet with correspondingly shaped internal frusto-conical surfaces formed within the collet 90 maintained in engagement with a shoulder on the right end of cylinder 80 by compression spring 95. It should be readily apparent from the foregoing that when the piston 85 is moved toward the left, the collet is expanded so as to clamp and hold the spindle 70 and center 24 in a predetermined position relative to the sleeve 61 and the headstock 22. A compression spring 94 normally holds the piston 85 and piston rod 86 in a right-hand end or unclamped position. A spring 99 is provided normally to hold the spindle 70 and the center 24 in a right-hand or loading position. The springs 95 and 99 are provided with sufficient compression which is less than that of the spring 34 in the footstock 21 so that the spindle 70 may be moved axially by the spring 34 in the footstock after the work piece 17 is moved axially toward the left by center 23 and into engagement with the center 24. The piston 32 acting on center 23 through spring 34 continues its movement toward the left to maintain a predetermined pressure on the work piece 17 during the positioning operation.

A solenoid piston-type valve 100 is provided comprising a slidably mounted valve member 101 which is provided with a pair of spaced valve chambers 102 and 103 for controlling the admission and exhaust of fluid from the clamping cylinder 80. A solenoid S1 is provided which, when energized, serves to shift the slidably mounted valve member 101 toward the right against the compression of a spring 104. The spring 104 serves normally to maintain the valve member 101 in a left-hand end position. In this position of the valve 100, fluid is exhausted from the right-hand end of the cylinder 80 through a pipe 105, through valve chamber 103, through a pipe 106, into the exhaust pipe 55.

When solenoid S1 is energized to shift the valve member 101 toward the right, fluid under pressure from the pipe 50 passes through the valve chamber 102, through the pipe 105 into the cylinder chamber formed at the right-hand end of the cylinder 80 so as to move the piston 85 and the piston rod 86 toward the left thereby compressing the spring 94 so as to expand the collet 90 thereby clamping the spindle 70 from further axial movement. The spindle 70 remains in the clamped position to locate the work piece and to maintain it in a predetermined relationship with the cutting tool illustrated in Fig. 1 as a grinding wheel.

A fluid pressure system is provided comprising a motor-driven fluid pump 110 which draws fluid through a pipe 113 from a reservoir 111 and passes fluid under pressure through the pipe 50. A relief valve 112 is provided to facilitate exhausting excess fluid under pressure directly to the reservoir 111 so as to maintain a substantial constant pressure within the fluid system.

A pneumatic work positioning mechanism 120 is provided to facilitate axial positioning of work piece 17 in a predetermined relationship with a cutting tool such as the grinding wheel 14 to facilitate finish grinding surfaces on the work piece to predetermined dimensions. The pneumatic work positioning mechanism 120 preferably comprises a base member 121 which is adjustably fixed by a pair of clamping screws 122 and 123 on the table 20. An air operated bellows 126 is fixedly mounted on the left-hand end of the base 121. The bellows is provided with the port 124 which is aligned with a hole 125 which is in turn connected to pass air under pressure through a nozzle 128. A pressure pipe 129 serves to convey air under pressure from a suitable source through a pressure regulating valve 130. A valve 132 is provided to facilitate turning on or off the supply of air under pressure. A check valve 135 is provided in the pipe 129 to prevent air under pressure backing up so as to fail to produce elongation of the bellows and the operation of the limit switch LS1. The nozzle 128 may be of any suitable type for directing air under pressure against a locating or reference surface 18 on the work piece 17. The nozzle 128 at all times remains out of operative engagement with the surface of the work piece but is arranged in close proximity thereto.

In locating a work piece 17 to be ground, the work piece is placed onto the work supporting rest 60 between the centers 23 and 24. The footstock center 23 is then moved toward the left so that it engages the right-hand end of the work piece and moves the work piece axially toward the left to position the left-hand end of the work piece in operative engagement with the headstock center 24. Further movement of the footstock center 23 toward the left moves the spindle 70 so as to compress the springs 95 and 99. During movement of the work piece toward left, the reference or locating surface 18 on the work piece 17 approaches the nozzle 128. The work piece 17 moves toward the left until the locating surface 18 is in a predetermined position closely adjacent to nozzle 128, thereby partially cutting off air escaping from the nozzle 128 so as to cause air under pressure to back-up into the bellows 126, elongating the bellows so as to close the contacts in the limit switch LS1 thereby closing a circuit to energize relay switch CR1. The energizing of relay switch CR1 closes a circuit so as to energize the solenoid S1 thereby shifting the valve 101 toward the right so that fluid under pressure passes through the valve chamber 102, through the pipe 105, into the cylinder 80 to actuate the collet 90 to clamp the headstock spindle 70 against further axial movement when the work piece has been precisely positioned axially relative to nozzle 128. The limit switch LS1 may be adjusted for various back pressures by loosening a nut 136 on a screw threaded shaft 137 which is carried by the bellows 126. By adjusting the nut 136, the contacts of the limit switch LS1 may be moved closer to or farther away from each other to decrease or increase the amount of back pressure required to close the circuit. The apparatus above described serves to precisely locate the work piece 17 relative to the grinding wheel 14 from a left-hand reference surface on the work piece.

The electrical circuit of the work positioning mechanism desirably includes a second normally open limit switch LS2 positioned to be closed by initial displacement to the left of footstock spindle 31. The limit switch LS2 is connected in series with solenoid S1 to prevent premature energization of the solenoid and also provides a holding circuit for maintaining relay switch CR1 energized even if limit switch LS1 is reopened inadvertently as by vibration after its contacts are initially closed by expansion of the bellows 126.

As shown in the Figure 2, a modification has been illustrated whereby a work piece may be located from a right-hand face on the work piece 150. The work positioning mechanism 120 is positioned on the table 20 so that the nozzle 128 is positioned adjacent to a right-hand locating surface 151 on the work piece 150. The limit switch LS1 is adjusted so that it becomes a normally closed switch instead of a normally open switch. A work rest 160 is provided for locating a work piece so that the locating or reference surface 132 is close enough to the nozzle 128 so that back pressure will elongate the bellows 126 and open the limit switch LS1 so as to de-energize the relay switch CR1 when air pressure is turned on by actuation of the valve 132. As in the embodiment illustrated in Fig. 1, a limit switch LS2 is arranged to prevent the energizing the solenoid S1 until the footstock spindle 31 and the center 23 move toward the left a sufficient distance to ready a circuit for energizing the solenoid S1 in axially positioning the work piece 150. The footstock spindle moves toward the left to move the work piece until the locating surface 151 is far enough away from the nozzle 128 to decrease the amount of back pressure within the bellows 126 thereby allowing the limit switch LS1 to close. The closing of the switch LS1 completes a circuit to energize the relay switch CR1 after movement of the footstock spindle toward the left serves to close the limit switch LS2. When both the limit switches LS1 and LS2 are closed, the relay switch CR1 is energized and maintained energized to complete a circuit so as to energize the solenoid S1 thereby shifting the valve 100 toward the right to pass fluid under pressure from the pipe 50, through the valve chamber 102, through the pipe 105, into the cylinder 80 to clamp the spindle 70 in an adjusted position with the reference face 151 on the work piece 150 located in a predetermined position relative to the grinding wheel 14.

After a work piece has been ground to the desired and predetermined extent in either embodiment of the instant invention, the footstock spindle 31 is retracted toward the right to open the limit switch LS2 thereby breaking a holding circuit to de-energize the relay switch CR1 so as to de-energize the solenoid S1. De-energizing solenoid S1 serves to release the compression of the spring 104 to move the valve member 101 toward the left thereby releasing the compression of the spring 94 to exhaust fluid from the cylinder 80 thereby unclamping the spindle 70. At the same time released compression of the springs 95 and 99 serve to move the spindle 70 toward the right into its initial position, as shown in Figure 1.

The operation of the locating apparatus will be readily apparent from the foregoing disclosure. The switch SW2 is first closed to start the fluid pump 110 to supply fluid under pressure to the various mechanisms. The switch SW1 is then closed to supply electric energy to the machine. The valve 132 is then opened to supply air under constant pressure to the work positioning and locating mechanism 120 and thence to the nozzle 128. A work piece 17 to be ground is placed on the work rest 60. The handle 47 is then moved in a clockwise direction toward the left to move the slidably mounted valve member 44 toward the left. In this position of the valve 40, fluid from the pipe 50 passes through the pipe 52 into the right-hand end of the cylinder 35 so as to move the piston 32, the footstock spindle 31, and the center 23 toward the left. Movement of the center 23 toward the left closes the limit switch LS2 and the center 23 engages the right-hand end of the work piece 17 and moves it along the work rest 60 into engagement with the headstock center 24. The work piece 17 is now held between the centers 23 and 24 and continues to move toward the left compressing the springs 95 and 99. Movement toward the left continues until the reference or locating surface 18 is precisely positioned relative to the grinding wheel 14. In this position air under pressure is cut off by the nozzle 128 sufficiently to build up a back pressure in the bellows 126 so as to close the limit switch LS1 thereby energizing the relay switch CR1 and energizing the solenoid S1. The limit switch LS2 which is now held closed by the footstock spindle 31 sets up a holding circuit to maintain the relay switch CR1 and the solenoid S1 energized during a grinding cycle.

The energizing of the solenoid S1 shifts the valve member 101 toward the right allowing fluid under pressure to enter the cylinder 80 thereby moving the piston 85 together with the piston rod 86 toward the left to expand the collet 90 thereby clamping the spindle 70 and stopping the axial movement of the spindle with the work piece 17 precisely located relative to the grinding wheel 14.

The piston 32 of the footstock 21 continues to move toward the left until it bottoms in the left hand end of the cylinder 35 compressing the spring 34 so as to thereby yieldably maintain the centers 23 and 24 in operative supporting engagement with the work piece 17 during a grinding operation. The grinding wheel 14 may then be fed toward the work piece 17 to a predetermined distance to grind the surfaces 15 and 16 of the work piece 17 to the desired and predetermined extent.

After the work piece 17 has been ground and the cutting tool such as grinding wheel 14 is withdrawn to an inoperative position, the lever 47 is moved in a counterclockwise direction to shift the valve member 44 so as to admit fluid under pressure to the left-hand end of the cylinder 35. The piston 32 together with the spindle 31 and the center 23 are moved toward the right into an inoperative position so that the ground work piece is dropped into the work rest 60. As the footstock spindle 31 moves toward the right, limit switch LS2 opens to break a circuit thereby de-energizing the relay switch CR1 and the solenoid S1 so as to allow the piston 85 to move toward the right under the released compression of the spring 94 to exhaust fluid from the cylinder 80 thereby releasing the collet 90 so that the spindle 70 may move toward the right under the compression of the springs 85 and 99 to a loading position. The above cycle of operation may then be repeated in the positioning and grinding of successive work pieces.

It will thus be seen that there has been provided by this invention apparatus in which the various objects hereinabove set forth together with many thoroughly practicable advantages are successfully achieved. As many possible embodiments may be made of the above invention and as many changes might be made in the embodiment above set forth, it is to be understood that all matter hereinbefore set forth, or shown in the accompanying drawings, is to be interpreted as illustrative and not in a limiting sense.

I claim:

1. In a machine tool having a base, a cutting tool, a work supporting means, a controlled axially movable means for moving a work piece to position a work piece relative to said cutting tool, means to clamp said work supporting means to hold the work piece in a predetermined position, a source of air under pressure, fixedly positioned means for directing air under pressure against a reference surface on a work piece, and a pressure sensitive means connected between said source of air pressure and said directing means to actuate said clamping means precisely to stop and hold said work supporting means and said work piece in a predetermined relationship with said cutting tool and out of engagement with said directing means.

2. In a grinding machine comprising a base, a cutting tool comprising a transversely movable rotatable grinding wheel, a work supporting means, a controlled axially movable means for moving a work piece axially to position the work piece relative to said cutting tool, means to clamp and hold said work supporting means to hold the work piece in a predetermined position, a source of air under pressure, fixedly positioned means for directing said air under pressure against a reference surface on a work piece and a pressure responsive means connected between the source of air under pressure and said directing means for actuating said clamping means to precisely position, stop and hold said work supporting means and work piece in a predetermined relationship with said cutting tool and out of engagement with said directing means.

3. In a machine tool comprising a base, a cutting tool, a work supporting means, a controlled axially movable means for moving a work piece axially to position the work piece relative to said cutting tool, means to clamp said work supporting means to hold the work piece in a predetermined position, a source of air under pressure, fixedly positioned means for directing air under pressure against a reference surface on a work piece, a pressure switch operatively connected to the source of electric power, a relay actuated by said switch, a solenoid actuated by said relay for actuating said clamping means, and a switch actuated by said axially movable means to precisely position said work supporting means and said work piece in a predetermined relationship with said cutting tool and out of engagement with said fixedly positioned means.

4. An axial work positioning mechanism for a machine tool having a cutting tool, means axially to move, support and hold a work piece having a reference surface, clamping means for fixedly positioning said work supporting means, fixedly positioned means to direct a source of air under pressure against said reference surface, pressure responsive means connected to said source of air pressure, an adjustable switch actuated by said pressure responsive means, a relay energized by said switch, a switch actuated by a said axially movable means to maintain a holding circuit, and a solenoid operated valve energized by said relay to actuate said clamping means precisely to stop and hold the work supporting means and a work piece in a predetermined relationship to the cutting tool and out of engagement with said fixedly positioned means.

5. In a grinding machine having a base, a transversely movable rotatable grinding wheel, a headstock having an axial movable work supporting means to support one end of a work piece, means for clamping said axially movable work supporting means, a footstock to support the other end of a work piece including means to axially move a work piece to position it relative to said grinding wheel, a work positioning means including a source of air under pressure, fixedly positioned means including a nozzle to direct said air under pressure against a reference surface on a work piece, a pressure responsive means connected between said source of air under pressure and said nozzle and a switch actuated by said pressure responsive means for actuating said clamping means precisely to stop said axially movable work supporting means so as to position and to hold a work piece in a predetermined relationship with the grinding wheel and out of engagement with said fixedly positioned means.

References Cited in the file of this patent

UNITED STATES PATENTS 2,639,562    Balsiger _____ May 25, 1953

FOREIGN PATENTS 742,658    Great Britain _____ Dec. 30, 1955